(No Model.)

J. J. COX & A. J. ALLISON.
HOSE COUPLER.

No. 350,188. Patented Oct. 5, 1886.

Witnesses
Chas. L. Taylor.
Wm N. Moore

Inventors
Joshua J. Cox and
Arza J. Allison,
By their Attorneys
C. A. Snow & Co.

UNITED STATES PATENT OFFICE.

JOSHUA J. COX AND ARZA J. ALLISON, OF PITTSBURG, KANSAS.

HOSE-COUPLER.

SPECIFICATION forming part of Letters Patent No. 350,188, dated October 5, 1886.

Application filed July 19, 1886. Serial No. 208,465. (No model.)

*To all whom it may concern:*

Be it known that we, JOSHUA J. COX and ARZA J. ALLISON, citizens of the United States, residing at Pittsburg, in the county of Crawford and State of Kansas, have invented a new and useful Improvement in Hose-Couplings, of which the following is a specification.

Our invention relates to an improvement in couplings for rubber or leather hose; and it consists in the peculiar construction and combination of devices, that will be more fully set forth hereinafter, and particularly pointed out in the claim.

Figure 1:
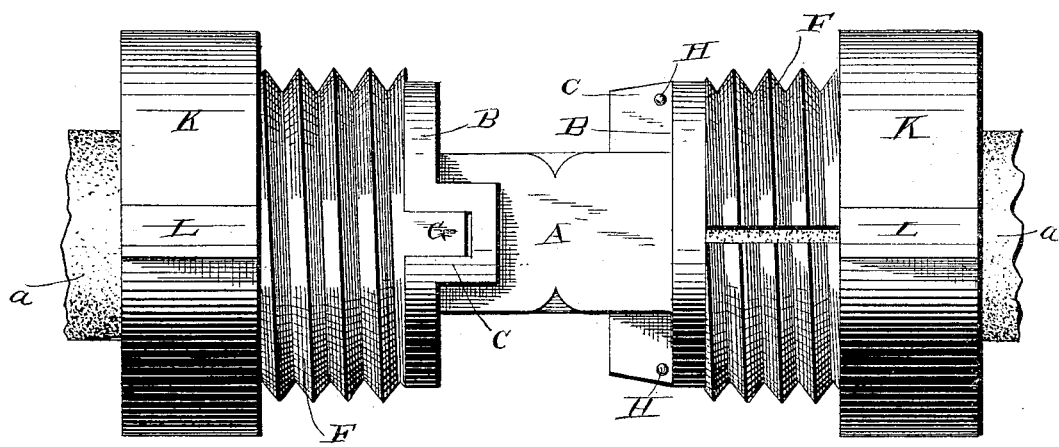
Figure 2:
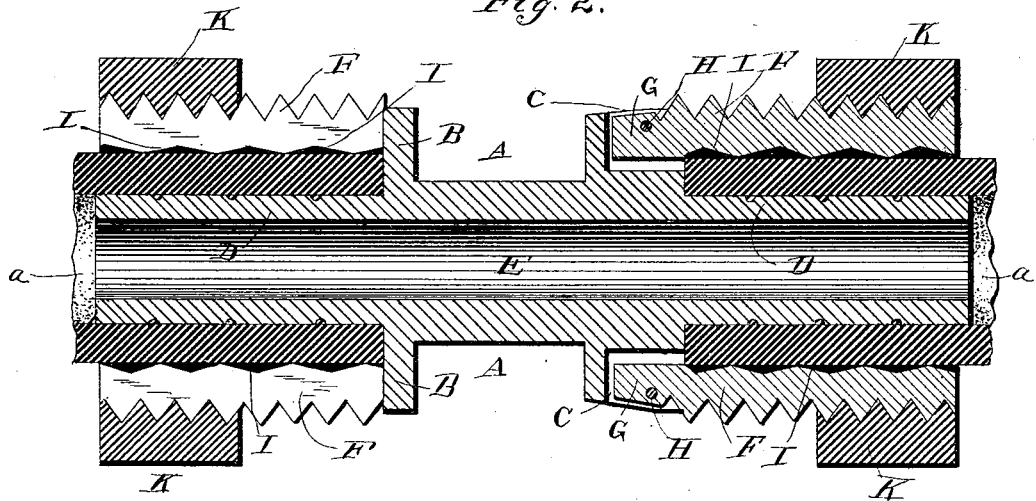

In the drawings, Figure 1 is a side elevation of a hose-coupling embodying our improvements. Fig. 2 is a vertical longitudinal sectional view of the same.

A represents the body of the hose-coupling, which is here shown as rectangular in shape at its central portion, and is provided with annular flanges B. On the inner sides of the said flanges are formed ears or sockets C, and from the outer sides of the said flanges project the outwardly-extending cylindrical spindles D. A bore or opening, E, extends longitudinally through the body of the coupling.

F represents semi-cylindrical clamping-jaws, the interior diameter of which is greater than the exterior diameter of the spindles D. The said jaws are provided on their inner edges with projecting tongues G, which are fitted in the sockets and between the ears C, and are pivoted therein by means of transverse pins H, thereby hinging or pivoting the clamping-jaws to the flanges of the body of the coupling. The said clamping-jaws are provided on their inner sides with corrugations I, or are otherwise roughened, so as to enable them to bite firmly on the ends of the hose, and the outer sides of the said clamping-jaws are screw-threaded, as shown, and thereby adapted to fit clamping nuts or collars K. The said nuts or collars may be either circular, as here shown, and provided with radial arms L, forming handles by which the said nuts may be turned on the screw-threads of the clamping-jaws, or the nuts may be hexagonal, octagonal, or of any other suitable shape, and thereby adapted to fit a wrench.

The operation of our invention is as follows: The rubber or leather hose *a* to be coupled together have their meeting ends passed over the projecting spindles D. The clamping-jaws F are then closed on the outer sides of the ends of the said hose, and the clamping nuts or collars are screwed onto the clamping-jaws, thereby causing the latter to bind the ends of the hose firmly on the projecting spindle, and thus securing them thereto.

A hose-coupling thus constructed is very cheap and simple, and enables hose to be very readily coupled together or detached from each other when desired.

We do not desire to limit ourselves to the precise construction hereinbefore shown and described, as many modifications may be made therein without departing from the spirit of our invention. We regard as of particular importance the combination of the spindle to receive the hose, the clamping-jaws to bear upon the hose, and the nut or collar screwed upon the clamping-jaws, in order to bind the hose firmly between the spindle and the said jaws.

Having thus described our invention, we claim—

The combination, in a hose-coupler, of the body A, having the spindles to receive the ends of the hose, and the flanges B, provided with the sockets C, the semi-cylindrical clamping-jaws F, having the interior corrugations to bear against the hose on the spindles, the exterior screw-threads, and the projecting tongues G, entering the sockets C and pivoted therein, and the interiorly-threaded clamping-collars K, to screw onto the clamping-jaws, substantially as described.

In testimony that we claim the foregoing as our own we have hereto affixed our signatures in presence of two witnesses.

JOSHUA J. COX.
ARZA J. ALLISON.

Witnesses:
E. L. MAXWELL,
R. E. CARLTON.